M. C. & S. L. BOLT & E. E. GOAD.
SPRING WHEEL.
APPLICATION FILED MAR. 25, 1915.
1,215,768.  Patented Feb. 13, 1917.
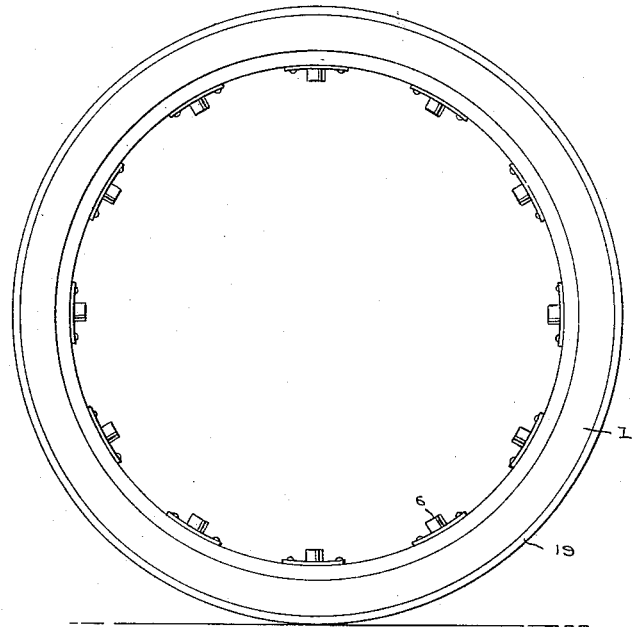
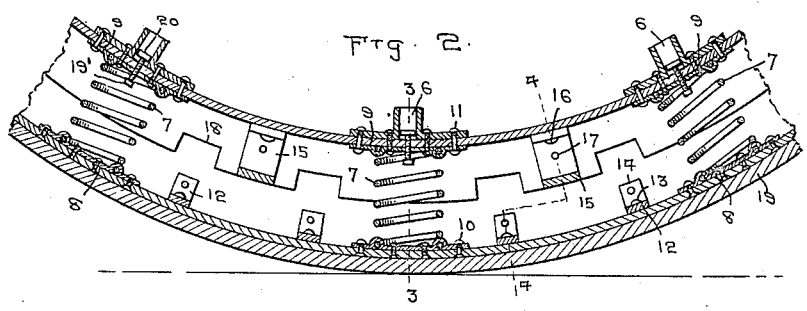
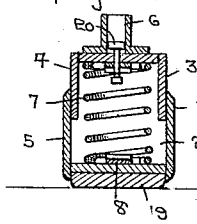
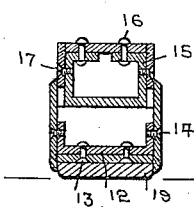
Inventors
M. C. Bolt, S. L. Bolt and E. E. Goad
By W. J. FitzGerald
Attorney
Witnesses

UNITED STATES PATENT OFFICE.

MALON C. BOLT, SYLVESTER L. BOLT, AND EDWARD E. GOAD, OF SWITCHBACK, WEST VIRGINIA.

SPRING-WHEEL.

1,215,768.    Specification of Letters Patent.    Patented Feb. 13, 1917.

Application filed March 25, 1915. Serial No. 16,911.

*To all whom it may concern:*

Be it known that we, MALON C. BOLT, SYLVESTER L. BOLT, and EDWARD E. GOAD, citizens of the United States, residing at Switchback, in the county of McDowell and State of West Virginia, have invented certain new and useful Improvements in Spring-Wheels; and we do hereby declare the following to be a full, clear, and exact description of the invention, such as will enable others skilled in the art to which it appertains to make and use the same.

Our invention relates to new and useful improvements in spring wheels and our object is to provide a telescoping rim or felly for the wheel in which are placed spring members for controlling the action of said telescoping members.

A further object is to provide means for engaging the ends of the spokes of the wheel.

And a further object is to provide suitable reinforcing means for the telescoping parts of the felly.

Other objects and advantages will be hereinafter set forth and more particularly pointed out in the accompanying specification.

In the accompanying drawings which are made a part of this application,

Figure 1 is a side elevation of the rim of a wheel showing the spokes removed.

Fig. 2 is an enlarged detail sectional view circumferentially of the rim.

Fig. 3 is a transverse sectional view as seen on line 3—3 of Fig. 2, and

Fig. 4 is a sectional view as seen on line 4—4 of Fig. 2.

Referring to the drawings in which similar reference numerals designate corresponding parts throughout the several views, 1 indicates the rim or felly of the wheel, which in the present instance is composed of a pair of substantially channel-shaped telescoping members 2 and 3, the side walls 4 of the member 3 extending between the free edges of the walls 5 of the member 2 so that said members will telescope with each other and be held against lateral movement independently of each other.

Secured to the member 3 at suitable intervals are sockets 6 which are adapted to receive the ends of spokes such as are ordinarily used in wheel construction.

Positioned between the telescoping members 2 and 3 are coiled springs 7, a spring being preferably positioned outwardly of each one of the sockets 6 so that a direct thrust of the spoke will be directed against the spring. The ends of the springs are secured respectively to the members 2 and 3 in any suitable manner, preferably by plates 8 and 9, said plates having channels in the faces thereof to receive portions of the springs, said plates being attached to their respective members in any suitable manner preferably by rivets or the like 10 and 11, the rivets 11 also serving to hold the sockets in position on the member 3.

The side walls of the member 2 are suitably reinforced by means of angle braces 12 which are attached to the base of the member 2 by means of rivets or the like 13 and to the walls 5 by means of screws or the like 14.

The walls of the member 3 are likewise reinforced by means of brace members 15, said brace members 15 being substantially rectangular in cross section and are attached to the base of the member 3 by means of rivets or the like 16 and to the side walls 4 by means of screws or the like 17, and by attaching the side walls of the members 2 and 3 to the brace members 12 and 15 by means of screws, the parts of the members 2 and 3 may be quickly assembled or disassembled as the occasion may require.

In order to permit the member 3 to have proper telescopic relation with the member 2, the inner edges of the walls 4 are provided with notches 18 which coöperate with the inwardly extending ends of the angle braces 12 and permit the member 3 to properly operate without coming in contact with said angle braces. By providing the telescoping members 2 and 3 and arranging the springs between the same, it will be readily seen that any jar or blow delivered to the face of the tire 19 will be taken up by the springs 7 and will not be communicated to the axle of the vehicle.

Extending through the base of the socket 6 is a threaded bolt 19′, the inner end of which is provided with a plate 20 which is adapted to clamp against the ends of the spokes to hold the spokes rigid with the sockets, and should the spoke be of such length as not to reach to the full length of the socket, the bolt 19′ can be turned until the plate clamps against the end of the spoke.

The bolts passing through threaded apertures in the plates 9 and member 3 serve to lock the plates in engagement with said member.

It will likewise be seen that by providing the telescoping side walls and reinforcing the same as shown, the parts of the telescoping members will be held in perfect alinement with each other and prevented from moving laterally independently of each other.

It will also be seen that in view of the simplicity of the device, it can be very cheaply constructed and can be attached to the usual or any preferred form of wheel without disturbing the spokes or hubs thereof.

What we claim is:—

In a device of the character described a rim composed of substantially channel-shaped telescoping members, angle braces secured to the base and side walls of the one member, angle braces secured to the base and side walls of the other member, the outer edges of the side walls of the last named member having notches for coöperation with the inwardly extended ends of the angle braces of the other member, and springs interposed between and bearing against the bases of said members.

In testimony whereof we have signed our names to this specification in the presence of two subscribing witnesses.

MALON C. BOLT.
SYLVESTER L. BOLT.
EDWARD E. GOAD.

Witnesses:
R. W. FEIL,
H. H. BILGER.

Copies of this patent may be obtained for five cents each, by addressing the "Commissioner of Patents, Washington, D. C."